United States Patent [19]

Zane et al.

[11] 4,245,393
[45] Jan. 20, 1981

[54] INSTANT POSITION FINDER AND COURSE PLOTTER

[76] Inventors: Anthony J. Zane, 3011 NW. Second Ave., Pompano Beach, Fla. 33064; Frederick C. Beurer, 3100 Riverside Dr., Apt. 206, Coral Springs, Fla. 33065

[21] Appl. No.: 4,571
[22] Filed: Jan. 18, 1979
[51] Int. Cl.³ .............................................. G01C 3/00
[52] U.S. Cl. ...................................... 33/276; 33/277; 356/144; 356/255
[58] Field of Search ................. 33/276, 278, 277, 280, 33/279; 356/145, 144, 255

[56] References Cited

U.S. PATENT DOCUMENTS

| 2,419,597 | 4/1947 | Rushmore | 33/279 |
| 2,531,248 | 11/1950 | Belch | 356/144 |
| 3,410,642 | 11/1968 | Chas | 356/144 |
| 3,876,313 | 4/1975 | Messler, et al. | 33/277 |

Primary Examiner—William D. Martin, Jr.

Attorney, Agent, or Firm—Birch, Stewart, Kolasch & Birch

[57] ABSTRACT

The present invention is directed to an instant position finder and course plotter. A first embodiment of the present invention relates to a three arm protractor which includes a circular base member, a fixed central arm and a movable left and right arm. Each arm of the protractor includes a sight at each extreme end which work in conjunction with a central sight in the circular base portion to permit an individual to accurately align the three arms of the protractor with three visible charted objects. A second embodiment of the present invention relates to an instant position finder and course plotter which utilizes sextant type mirrors to reflect the right and left objects being viewed onto target mirrors positioned on the apex of the base. The center object is sighted over the two target mirrors through a scope mounted at the rear of the instrument. The second embodiment of the present invention enables an individual to see all three objects simultaneously.

12 Claims, 5 Drawing Figures

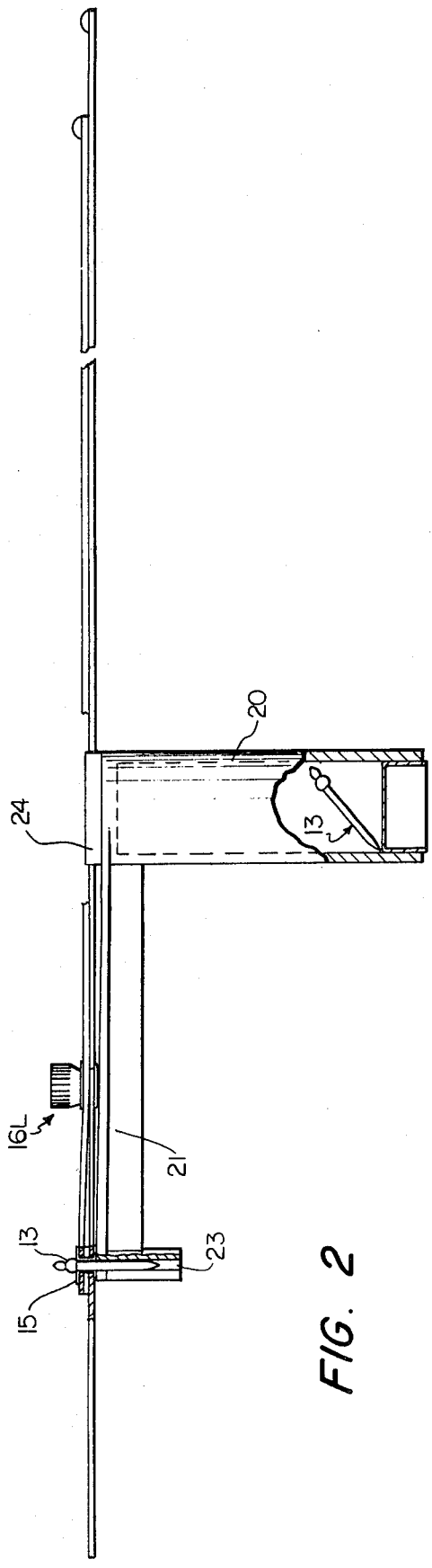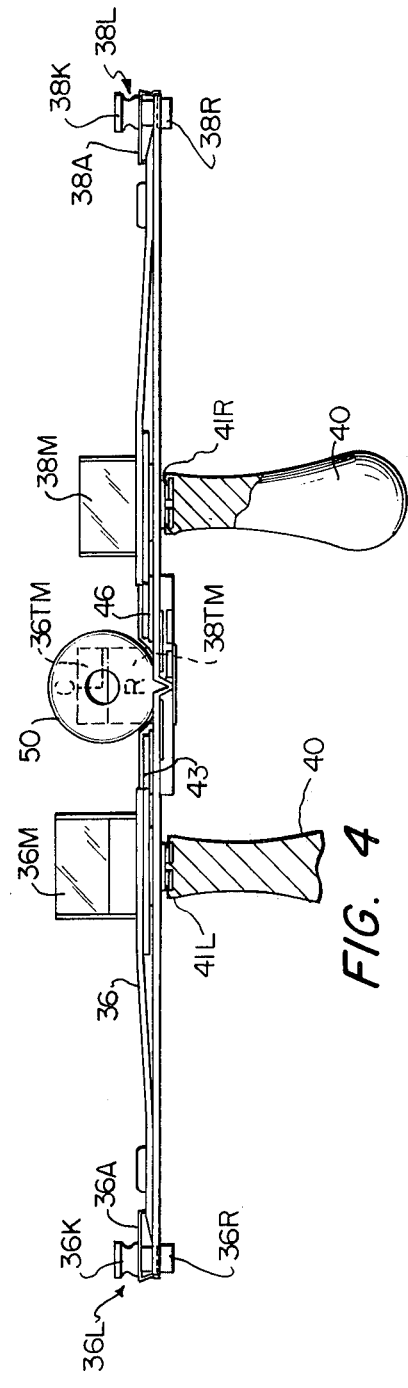

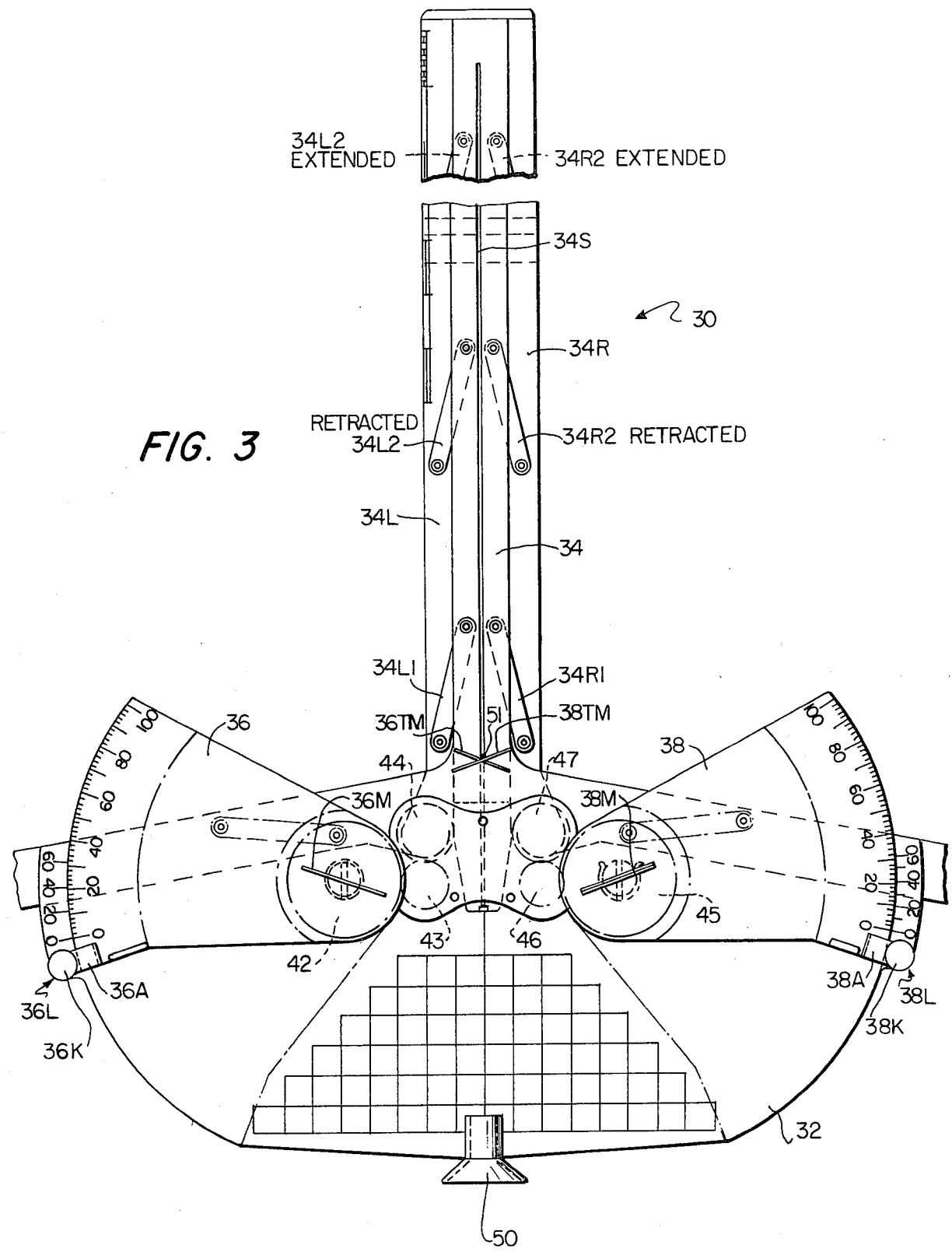

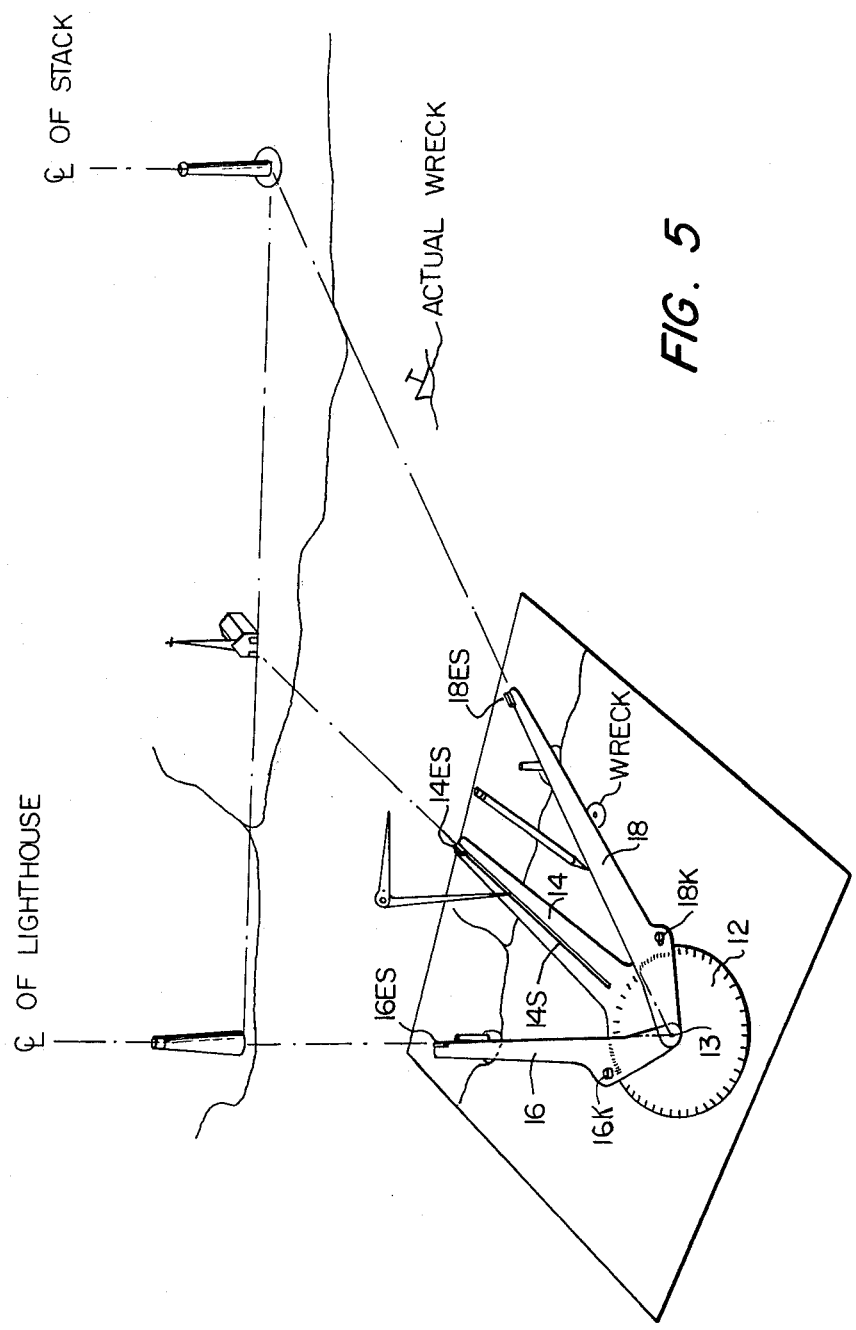

INSTANT POSITION FINDER AND COURSE PLOTTER

BACKGROUND OF THE INVENTION

1. Field of the Invention

The present invention is directed to an instant position finder and course plotter which may be used in combination with a navigational chart or map to determine an individual's exact location.

2. Description of the Prior Art

A few navigational aids are available in the prior art which attempt to enable an individual to determine his position. For example, the Endo patent, U.S. Pat. No. 3,859,731 discloses an instrument for determining the position from which a two-dimensional photograph was taken. The instrument includes three verniers $III_1$, $III_2$, and $III_3$, which are rotatably mounted about the center P. By aligning the three verniers with three points a, b and c on a photograph, and thereafter fixing the three verniers relative to each other, an individual may determine the position of a camera which took the photograph by positioning the instrument on a map or chart and aligning the verniers with the reference point A, B and C.

Another prior art instrument is disclosed in the Herrick patent, U.S. Pat. No. 2,679,105, for relocating a position. The instrument 10 includes three arms 34, 44 and 46 pivoted about the element 26.

Further, a number of navigational aids are available in the prior art which use mirrors to locate objects. For example, the Chas patent, U.S. Pat. No. 3,410,642, discloses an instrument for determining the position of a ship. This disclosure includes a movable mirror 10 which is used to superimpose the image of a center object with the image of a right and left object. However, the Chas patent does not disclose a base portion which is calibrated in degrees nor does it disclose the use of a scale positioned along the arms of the instrument. in addition, the mirrors disclosed by Chas are not arranged in the same manner as the sextant type mirrors of the present invention.

The Rolefson patent, U.S. Pat. No. 3,822,480 discloses a position locator or homing device for use by a fisherman. Although the Rolefson patent enables an individual to simultaneously view three landmarks, it does not disclose the specific combination of elements set forth in the present invention.

The disadvantages of the prior art navigational aids are overcome by the instant position finder and course plotter of the present invention. More particularly, the first embodiment of the present invention includes a circular central portion with a fixed center arm and a movable left and right arm. The movable left and right arm are mounted on the circular base member by a center pivot which also functions as a rear sight. Further, a sight is mounted at the outermost extremity of each of the arms. An individual may readily use the instant position finder and course plotter of the present invention by aligning the center arm with a visible charted object. Subsequently, the individual would move the left and right arms to align them with adjacent charted objects positioned to the left and right of the center object. After the instrument is properly aligned on the chart using the observed objects an individual would then have his instant position on the chart at the apex of the pivot sight and he may then also determine his relative distance from his next destination or any other chosen point by utilizing a scale positioned along the arms of the instrument appropriate to the scale of the chart in use as taken from the chart legend.

The instant position finder and course plotter of the present invention can measure an angle of up to 90° to the right or left of the center arm for a total of 180°. Further, the circular base portion includes degree markings up to 360° to the left and to the right of the fixed center arm. Therefore, the angular relationship of the arms relative to the fixed center arm may be readily determined.

The second embodiment of the present invention utilizes sextant type mirrors to reflect the right and left objects being viewed onto target mirrors positioned on the apex of the base of the center arm. The center object is sighted over the two target mirrors through a scope mounted at the rear of the instrument thus enabling the user to simultaneously sight all three objects.

SUMMARY OF THE INVENTION

It is an object of the present invention to provide a three armed protractor including a circular base member, a fixed center arm and a movable left and right arm.

A further object of the present invention is to provide a three armed protractor with a sight positioned in the center or apex of the circular base member and at the extremities of each of the arms.

Another object of the present invention is to provide a three armed protractor which includes a central base portion that is calibrated in degrees from a zero point corresponding to the fixed center arm.

A still further object of the present invention is to provide an instant position finder and course plotter which is constructed of clear plastic and has a grid inscribed on the circular base member which may be aligned with the grid markings of a nautical chart or map.

Another object of the present invention is to provide a slit in the fixed center arm which aids an individual utilizing the instrument to align the three charted objects thus obtaining his instant position.

A still further object of the present invention in a second embodiment is to provide a navigational aid which includes sextant type mirrors to reflect the right and left objects being viewed onto target mirrors positioned on the apex of the base of the center arm. Further, the center object is sighted over the two target mirrors through a scope positioned at the rear of the instrument thus enabling an individual to simultaneously sight all three objects.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 illustrates a partial cross-sectional view of the instant position finder and course plotter illustrated in FIG. 1;

FIG. 3 illustrates a plan view of a second embodiment of the instant position finder and course plotter according to the present invention;

FIG. 4 illustrates a partial cross-sectional view of the instant position finder and course plotter illustrated in FIG. 3; and FIG. 5 schematically illustrates the operation of the instant position finder and course plotter according to the first and second embodiment of the present invention.

DETAILED DESCRIPTION OF THE INVENTION

Figure 1:
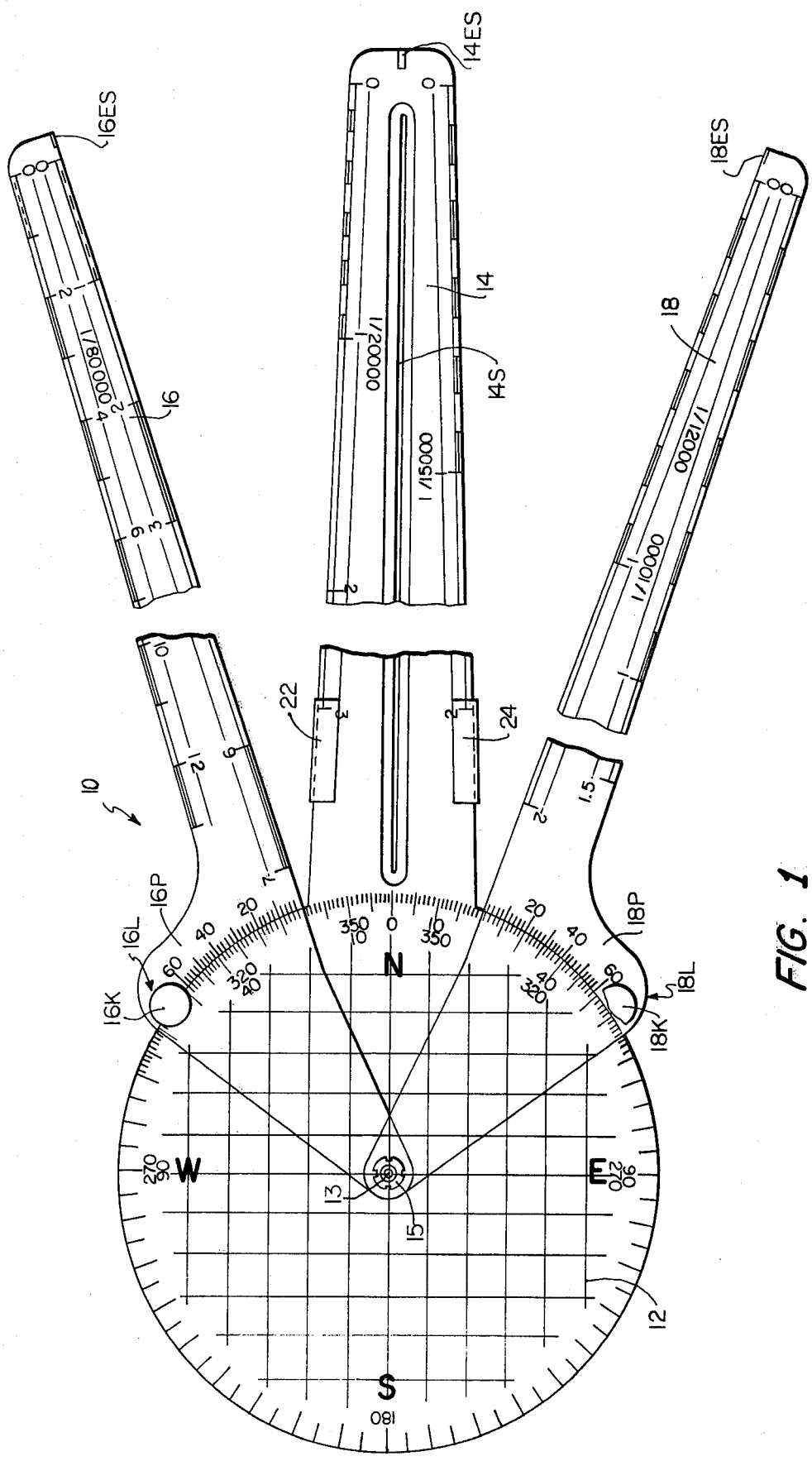
FIG. 1 illustrates a plan view of the instant position finder and course plotter according to a first embodiment of the present invention.

Referring to FIGS. 1 and 2, the first embodiment of the present invention is generally indicated by character 10. A circular base member 12 includes a fixed center arm 14 and adjustably mounted movable left arm 16 and movable right arm 18.

The circular base member 12 is graduated to single degrees and numbered every 10°/360° clockwise and counter clockwise from the zero degree point positioned adjacent to the fixed center arm 14. Further, the instrument is preferably made of a clear material, for example, plastic, and includes a grid inscribed on the circular base member which may be conveniently aligned with a meridian or parallel on a chart or map being used in combination with the instrument.

The movable left arm 16 and right arm 18 are affixed to the center of the circular base member 12 by means of a center sleeve 15. The center pivot sight 13 projects downwardly from the upper surface of the instrument into an aligning opening in a stabilizing arm 21 of the handle 20. As illustrated in FIGS. 1 and 2, the handle 20 includes a mounting connector 22, 24 which slidably wedge locks with the edge surfaces of the fixed center arm 14 and is aligned and secured to the instrument by means of the center pivot pin is projecting into the opening 23 of the stabilizing arm 21. The handle 20 is hollow and may be utilized to store spare parts, such as an additional center sight pivot pin.

The movable left arm 16 and right arm 18 are affixed relative to the center point of the circular base member 12 by means of a locking sleeve 15. The center sight pivot pin 12 projects downwardly through an opening in the sleeve 15 to be received in the opening 23 of the stabilizing arm 21. Further, the movable left arm 16 includes a quick acting lock 16L. Similarly, the movable right arm 18 includes a quick acting lock 18L. The quick acting locks 16L, 18L engage the peripheral surface of the circular base member 12 and are mounted in outwardly projecting portions 16P, 18P of the movable arms. The quick acting locks include a knob 16K, 18K which is threaded to a retaining member 16R, 18R (not shown) to releasably affix the outer peripheral surface of the circular base member 12 to the respective movable left arm and movable right arm. Rotating the knob 16K, 18K displaces the retaining member upwardly to thereby lock the circular base member to the respective movable arm.

As illustrated in FIG. 1, each movable arm includes a 29-30 single direct vernier reading to two minutes of arc. The vernier scale overlaps the graduated single degrees inscribed on the peripheral surface of the circular base member 12. By graduating the scales on the adjoining surfaces of the movable arms and the peripheral surface of the circular base member parallax is eliminated.

The fixed center arm 14 includes a slit 14S which extends from the circular base member 12 to a point adjacent to the outer extremity of the arm near the end sight 14ES. This slit enables an individual to quickly align the instrument on a chart or map. Similarly, the movable left arm 16 includes an end sight 16ES and the movable right arm 18 includes an end sight 18ES.

As illustrated in FIG. 5, the instant position finder and course plotter of the present invention may be readily utilized in combination with a navigational chart or map. Upon sighting three charted objects, an individual would align the fixed center arm 14 with the center object by sighting the object along the center sight pivot pin 13 and the end sight 14ES. Subsequently, an individual would align the movable left arm 16 by sighting along the center sight pivot pin 13 and the end sight 16ES. Thereafter, an individual would align the movable right arm 18 by sighting along the center sight pivot pin 13 and the end sight 18ES. With the instrument properly aligned, the knob 16K, 18K are rotated to tighten the restraining members relative to the outer peripheral surface of the circular base member 12 and thereby affix the arms to the base member. Thereafter, with the instrument properly aligned, it may be positioned on a navigational chart or map which is aligned with the adjoining sighted objects. In this manner, the center sight pivot pin 13 will indicate the exact position on the navigational chart or map at which the individual utilizing the instrument is located. Further, since the instrument is made of a clear material, for example, plastic, the grid inscribed on the circular base member 12 may be aligned with an appropriate meridian or parallel on the navigational chart to obtain and plot the users true course.

As illustrated in FIG. 1, each of the arms may be inscribed with nautical mile measuring scales. The scales inscribed on the arms would correspond with chart scales of 1-10,000; 1-12,000; 1-15,000; 1-20,000; 1-40,000; and 1-80,000 inches. Although these nautical mile measuring scales are illustrated in the drawings, the arms of the navigational aid may be inscribed with any desired nautical mile measuring scales.

In view of the description above, it will be readily apparent that the instant position finder and course plotter of the present invention may be readily employed by a navigator or surveyor utilizing the instrument together with a navigational chart or map. The instrument permits an individual to quickly measure the adjacent horizontal angles between three charted objects without the use of a sextant or pelorus. The measuring of the horizontal angles is easily achieved by sighting along a center sight pivot pin and the end sights positioned adjacent to the outermost extremity of each of the arms. Further, as illustrated in FIG. 5, after an individual has accurately positioned the instrument relative to three charted objects, he marks his position through the pivot hole. Using either arm unlocked the navigator then draws a course line from the previously obtained position to his next destination. By squaring the grid in the center of the protractor on a convenient meridian or parallel he obtains his true course from the protractor. To measure distance he uses the nautical mile measuring scale on one of the arms corresponding to the scale of the chart in use.

The instant position finder and course plotter is designed to be used in combination with the handle 20 and stabilizing arm 21. After an individual has properly aligned the three arms relative to three charted objects wherein the objects are preferably in a line with each other or on a line with the center object curving towards the observer, then the handle 20 and the stabilizing arm 21 may be removed from the instrument so that the instrument may be positioned directly onto a navigational chart or map. Thereafter, the protractor may be positioned by spearing the pivot sight pin 13 or a divider point through the slit 14S into the center object on the chart thus making the center object captive and making it easier to maneuver the locked left and right arms to align with the appropriate left and right charted objects. The observers position is the apex of the pivot sight.

The second embodiment of the present invention illustrated in FIGS. 3 and 4 functions in the same manner as the first embodiment of the present invention illustrated in FIGS. 1, 2 and 5. However, the second embodiment of the present invention utilizes sextant type mirrors to enable an individual to simultaneously sight three objects. The sextant type position finder and course plotter is generally indicated by character 30. A semicircular base member 32 includes a fixed center arm 34 and adjustably mounted movable left quadrant 36 and movable right quadrant 38, in conjunction with 2.1 ratio gear driven parallel arms to contact apex 51 once rotated off 0° or 100° positions.

The semicircular base member 32 is preferably constructed of a clear material, for example, plastic, and includes a grid inscribed on the semicircular base member which may be conveniently aligned with a meridian or parallel on a chart or map being used in combination with the instrument. The left and right quadrants are graduated to single degrees and numbered every ten degrees. Further, a vernier scale is mounted on the semicircular base member 32 and includes a 29-30 single direct vernier reading to two minutes of arc. The vernier scale overlaps the graduated single degrees inscribed on the peripheral surface of the left and right quadrants 36, 38. By graduating the scales of the adjoining surfaces of the movable left and right quadrants and the outer peripheral surface of the semicircular base member, parallax is eliminated.

A left hand index mirror 36M is affixed for movement to the left hand quadrant 36. Mounted beneath the left hand quadrant 36 is a slip connector 41L which is affixed to a gear 42 which is in meshing engagement with the gear 43. In addition, the gear 43 is in meshing engagement with the gear 44 which imparts movement to the left hand parallel rotating arm 34L. Upon connecting a handle 40 to the slip connector 41L and imparting rotary motion to gear 42 and quadrant 36, a 2 to 1 ratio is transmitted from the gear 42 to the gear 43 to gear 44 which imparts movement to the left hand parallel rotating arm 34L. This 2 to 1 ratio is comparable to the degrees marked on the quadrant in degrees and minutes.

Similarly, a right hand index mirror 38M is affixed for movement with the right hand quadrant 38. A slip connector 41R is mounted adjacent to the lower surface of the right hand quadrant 38 and is connected to a gear 45. The gear 45 is in meshing engagement with the gear 47 which imparts movement to the right hand parallel rotating arm 34R. Rotary motion imparted to the handle 40 rotates the slip connector 41R and quadrant 38 to a 2 to 1 ratio which is transmitted from gear 45 to gear 46 to gear 47 which imparts movement to the right hand parallel rotating arm 34R which is affixed to gear 47. The gears are arranged in a 2 to 1 ratio which is comparable to the degrees marked on the right hand quadrant in degrees and minutes.

The left hand quadrant 36 includes a quick acting lock 36L. Similarly, the right hand quadrant 38 includes a quick acting lock 38L. The quick acting locks 36L, 38L are mounted on the peripheral surface of the semicircular base member 32. The quick locks include a knob 36K, 38L which is threaded to a retaining member 36R, 38R to releaseably affix the outer peripheral surface of the semicircular base member 32 to the movable left hand quadrant and movable right hand quadrant, respectively. Rotating the knobs 36K, 38K downwardly displaces the arms 36A, 38A to affix the circular base member to the respective movable quadrants.

The semicircular base member 32 includes a rear eye piece 50 through which three objects may be simultaneously sighted. The simultaneous sighting of three objects is possible because of the positioning of the fixed left hand target mirror 36TM and the fixed right hand target mirror 38TM. As illustrated in FIG. 4, an individual viewing three objects would see the right hand object in the lower portion of the eye piece, the left hand object in the center portion of the eye piece and the center object in the uppermost portion of the eye piece. In sighting the objects through the eye piece, if the right or left object is inaccurately positioned, an individual would merely rotate the right or left handle 40 to accurately align the left hand quadrant mirror 36M or the right hand quadrant mirror 38M so that the respective objects are clearly viewed through the left or right fixed target mirrors.

The fixed center arm 34 includes a slit 34S to aid in aligning the instrument arms to pick up the left and right objects similar to the first embodiment. Further, a left hand parallel rotating arm 34L is positioned under one half left side of the center arm 34 by means of linkages 34L1 and 34L2. Similarly, a right hand parallel rotating arm 34R is mounted under one half right side of the central arm 34 by means of a plurality of linkages 34R1, 34R2. In addition, the central arm 34, 34R and 34L may be extended or retracted into a slot in their respective arms to reduce the overall dimension of the instant position finder and course plotter according to the second embodiment of the present invention.

The parallel arms 34L and 34R rotate from 0° to 100° and are correlated with their respective quadrant index reading in degrees. The left quadrant 36 and the right quadrant 38 are locked in position. The parallelogram arms are then open to the apex of the target mirrors. Thereafter, the handles 40 are removed from the instrument and the instrument may be positioned directly on a navigational chart or map. A divider point is positioned into the center object via the center arm slot 34S thus making the center object captive and enabling the user to easily align the left and right objects with the left and right arms. In this manner, an individual utilizing the instrument may locate his exact position at the apex of the target mirrors.

The instrument according to the present invention is extremely useful as a navigational aid when a gyroscope fails because of an electrical failure or other reason. The instrument is useful for quickly and accurately plotting a ship's position by utilizing horizontal angles of charted objects. In addition, the instrument may be used by scuba divers to accurately locate an underwater position on a chart and to easily return to that position. Similarly, fishermen may use the instrument according to the present invention to accurately locate a favorite fishing spot.

In addition to the uses mentioned above, the instrument according to the present invention may be utilized on small vessels working on navigational aids and buoys. The instrument may be used from any position on the vessel and requires little experience once the user receives basic instructions. The instrument is helpful in quickly verifying the exact location of an object being worked on. Still further, the instrument has utility for surveying poorly charted waters. It is extremely helpful in the event of an electrical failure of electronic aids which are normally used. In addition, the instrument is invaluable for hydrographic surveys where accurate positions are often required at intervals of every few minutes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An instant position finder and course plotter comprising:
   a base member including an outwardly projecting fixed central arm, said base member being constructed of a transparent material and including a center grid inscribed thereon for aligning said base member with an appropriate meridian or parallel on a navigational chart, said outwardly projecting fixed central arm including a slit therethrough extending from said base member to a point adjacent to the outer extremity of said central arm and said outwardly projecting fixed central arm further including nautical mile measuring scales inscribed thereon;
   a left quadrant including a left index mirror movably mounted as a unit on said base member;
   a right quadrant including a right index mirror movably mounted as a unit on said base member;
   fixed left and right target mirrors positioned in operable relationship to said left and right index mirrors, whereby three objects may be simultaneously sighted with the left target mirror and the left index mirror, the right target mirror and the right index mirror, and the fixed central arm;
   a left handle means operatively connected to said left index mirror; and
   a right handle means operatively connected to said right index mirror;
   said left and right handle means being adapted to permit an individual to readily hold and use the instant position finder and being further adapted to permit rotation of said left index mirror and right index mirror, respectively.

2. An instant position finder and course plotter according to claim 1, wherein each of said left and right quadrants include slip connectors adapted to mate with said left and right handle means for imparting movement to each of said left and right quadrants.

3. An instant position finder and course plotter according to claim 2, wherein a gear mechanism increases the left and right arm movement of said handle members to a 2 to 1 ratio.

4. An instant position finder and course plotter according to claim 1, wherein each of said left and right quadrants is constructed of clear material and include graduated degree markings inscribed thereon, by graduating the scales of the adjoining movable surfaces, parallex is eliminated.

5. An instant position finder and course plotter comprising:
   a base member including an outwardly projecting fixed central arm;
   a left quadrant including a left index mirror movably mounted as a unit on said base member;
   a right quadrant including a right index mirror movably mounted as a unit on said base member;
   fixed left and right target mirrors positioned in operable relationship to said left and right index mirrors, whereby three objects may be simultaneously sighted with the left target mirror and the left index mirror, the right target mirror and the right index mirror, and the fixed central arm; and
   each of said left and right quadrants include slip connectors adapted to mate with handle members for imparting movement to each of said left and right quadrants.

6. An instant position finder and course plotter according to claim 5, wherein said fixed central arm includes a slot extending along the arm.

7. An instant position finder and course plotter according to claim 5, wherein said fixed central arm and movable arm include nautical mile measuring scales inscribed thereon.

8. An instant position finder and course plotter according to claim 5, and further includes a grid inscribed to the base member to conveniently align instrument with meridians or parallels when a true course is desired from any point on the chart.

9. An instant position finder and course plotter according to claim 5, wherein a gear mechanism increases the left and right arm movement of said handle members to a 2 to 1 ratio.

10. An instant position finder and course plotter according to claim 1, and further including an eye piece mounted on said base member for facilitating the simultaneous sighting of three objects.

11. An instant position finder and course plotter comprising:
    a base member includingg an outwardly projecting fixed central arm;
    a left quadrant including a left index mirror movably mounted as a unit on said base member;
    a right quadrant including a right index mirror movably mounted as a unit on said base member;
    fixed left and right target mirrors positioned in operable relationship to said left and right index mirrors, whereby three objects may be simultaneously sighted with the left target mirror and the left index mirror, the right target mirror and the right index mirror, and the fixed central arm; and
    left and right parallel type arms that correlate actual sighted mirror position with actual degree readings through gears that give the arms a 2 to 1 ratio with quadrant movement of 1.

12. An instant position finder and course plotter according to claim 11 and further includes means for telescoping said central arm and said left and right parallel arms to reduce the size of the instrument for storage.

* * * * *